United States Patent Office 3,790,502
Patented Feb. 5, 1974

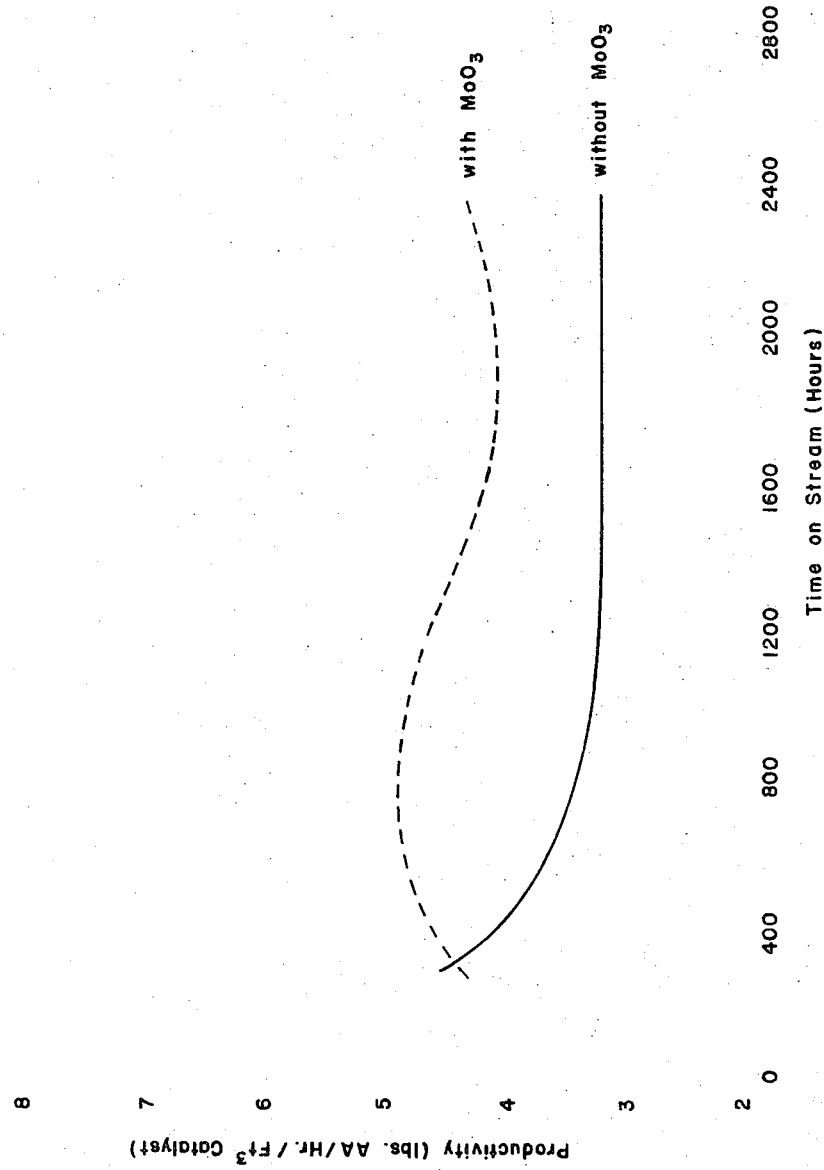

3,790,502
CATALYST AND METHOD OF MANUFACTURE
Joseph W. Nemec, Rydal, Pa., and Francis W. Schlaefer, Pennsauken, N.J., assignors to Rohm & Haas Company, Philadelphia, Pa.
Application Dec. 13, 1968, Ser. No. 783,641, now Patent No. 3,637,835, which is a continuation-in-part of applications Ser. No. 555,247, June 6, 1966, now abandoned, and Ser. No. 615,880, Feb. 6, 1967, now Patent No. 3,527,716. Divided and this application Sept. 21, 1971, Ser. No. 182,347
Int. Cl. B01j 11/74
U.S. Cl. 252—439
11 Claims

ABSTRACT OF THE DISCLOSURE

A catalyst, a method for its preparation, and a method of preparing catalytic cobalt molybdate, useful for the oxidation of olefins to the corresponding unsaturated aldehydes and unsaturated carboxylic acids are provided. The solid catalyst is in the form of particles, each particle comprising a fluxed mixture of (a) calcined cobalt molybdate particles, (b) a telluride of arsenic, bismuth or antimony, and (c) a molybdenum compound, such as molybdenum trioxide, which is volatile to an extent that slow migration within the pellet occurs at elevated temperatures. The volatile molybdenum compound, non-catalytic in itself, surprisingly gives a much longer productive life to the catalyst; the catalyst, in spite of the diluent, is more productive per unit of time; and the added physically soft compound does not make the particles fragile. In use, the tellurium content diminishes, and the composition of the catalyst changes slowly in other ways.

---

This application is a division of application Ser. No. 783,641, filed Dec. 13, 1968, now Pat. No. 3,637,835, which is a continuation-in-part of applications Ser. No. 555,247, filed June 6, 1966, now abandoned, and Ser. No. 615,880, filed Feb. 6, 1967, now Pat. No. 3,527,716.

Processes and catalysts are well known in the art for achieving the conversion of olefins, such as propylene and isobutylene, to the corresponding unsaturated aldehydes and unsaturated carboxylic acids, by the vapor phase reaction at elevated temperatures of the olefin with oxygen in the presence of water and various metal oxide catalysts. The known processes are often burdened by low yields of desired products due to waste gas formation, toxicity problems from the use of volatile promoters, expensive reactor construction, and inefficient operation due to catalyst deterioration. A virtue of the present invention includes the provision of a physically stable, efficient, selective, highly productive catalyst system having improved catalyst longevity.

Said U.S. patent applications Ser. Nos. 555,247 and 615,880, filed June 6, 1966 and Feb. 6, 1967 respectively, describe methods for preparing unsaturated acids or unsaturated aldehydes by reacting the corresponding olefin in the vapor phase at an elevated temperature with molecular oxygen, or a gas containing oxygen, in the presence of water vapor and a novel catalyst comprising cobalt molybdate and a telluride of antimony, bismuth, or arsenic. This novel catalyst provides high productivity over a prolonged period as well as high selectivity and physical stability during extended periods of catalyst use. Surprisingly, it was found that the telluride not only functions as a binder for the cobalt molybdate, but that the combination gives better results than the cobalt molybdate alone. Nevertheless, some reduction of catalytic activity has been observed with these catalysts after lengthy use and it is an object of this invention to provide a catalyst having an even longer catalyst life.

The problem of diminishing catalyst life is recognized and methods are known to alleviate this undesired reduction in catalyst activity. U.S. Pat. 3,236,782 describes a method of maintaining the useful catalytic life of a catalyst by passing the reactor feed over a bed of molybdenum trioxide pellets placed upstream from the catalyst used to catalyze the reaction. Although this method results in some improvement of catalyst longevity, the procedure is not particularly effective when the reactor has been on stream for extended periods.

Catalysts for use in the subject process should have a number of desirable properties. The physical form is desirably a particle or pellet, the active ingredients being intimately and uniformly distributed therein. The particle must be strong enough so that physical handling thereof and conducting gases through a bed thereof at elevated temperatures does not result in disintegration of the pellets.

The weight of a twenty or thirty feet high bed of catalyst particles and the high temperature, as well as the vibration caused by a high speed stream of gas passing therethrough, destroy pellets having low physical strength. Any inert materials such as carriers added thereto or mingled therewith must be such that the desired physical properties are improved or unchanged. It is apparent that dilution by an inert material distributed throughout the pellet would normally be expected to provide a pellet which presents less active catalyst material for utilization than does a pellet of the same size absent the inert material, thereby adversely affecting productivity per given quantity of catalyst. A softer inert material would be expected to seriously detract from pellet strength. The coefficient of thermal volume expansion of solids admixed in the pellet must be such that the elevated temperatures encountered do not result in the rapid disintegration of the pellets. Similarly, the materials must be combined in a manner to give the pellet a structure and strength such that variations in coefficients of thermal volume expansion are, in effect, not a defect in the catalyst particle. Accordingly, when modification of a successful catalyst is contemplated, as in the addition of carriers, promoters, inert diluents, other active catalysts and the like, all of the foregoing factors must be taken into consideration.

Of great importance is the useful life of a given catalyst. One which loses activity at such a rate that its economically useful life is only a few months is, as a practical matter, not sufficiently economical. The useful life should be at least six months, and preferably from one to two years.

An object of the present invention is to increase the life of, and maintain high productivity of the novel catalysts disclosed in said U.S. patent applications Ser. Nos. 555,247 and 615,880.

Another object of the invention is to achieve the foregoing object by adding a catalytically inert, slightly volatile molybdenum compound, such as molybdenum trioxide, which is a soft solid when compared to said catalysts.

Yet another object is to provide methods of preparing a catalyst containing said molybdenum compound which provides catalyst pellets or particles having as good or better physical stability, as good or better productivity, and extended life at said high productivity, as compared with the catalysts disclosed in said U.S. applications Ser. Nos. 555,247 and 615,880.

An additional object of the invention is to achieve the foregoing objectives by the use of catalytic cobalt molybdate having superior properties prepared by a novel method under critical conditions.

Another object of the invention is to provide a method for the vapor phase oxidation of olefins such as propylene to useful products. The manner of accomplishing the foregoing objects of the invention will be apparent from the following description of the invention.

The catalyst system of the present invention is prepared by combining specially calcined cobalt molybdate, a telluride of arsenic, bismuth or antimony, and an added amount of molybdenum trioxide or another volatile molybdenum compound and fluxing the mixture at a temperature which depends upon the calcining temperature. The weight of the added amount of volatile molybdenum compound ranges from 0.5% to about 80%, and preferably about 8% to about 30%, based on the total weight of the cobalt molybdate-telluride-volatile molybdenum compound catalyst system. Although some benefit is obtained using less than 8% of the molybdenum compound, the preferred minimum amount is, relatively, more effective. The volatile molybdenum compounds may be a molybdenum oxide, a molybdenum halide, a molybdenum oxyhalide or a molybdenum sulfide.

As used herein, the terms "volatile molybdenum compound" or "sublimable molybdenum compound" mean any molybdenum compound which volatilizes or sublimes slowly at the reaction temperatures of the oxidation process, i.e., from about 350° C. to 500° C. or higher, but is a solid at these temperatures. Thus, while the literature shows that molybdenum trioxide, sometimes called molybdic anhydride, sublimes at 1155° C., it is believed that at the said reaction temperature sufficient $MoO_3$ is volatilized, or perhaps in some other manner, is caused to slowly migrate over a period of months or years, within the catalyst particle and to the surface thereof, to provide the benefits of the invention. The fluxing of the catalyst results in a particle structure of limited permeability such that the molybdenum compounds, including those relatively more volatile than $MoO_3$, are released or migrate at extremely slow rates, but in sufficient amounts to maintain the activity of the catalysts. Such theories and hypotheses as are expressed herein are intended to further the understanding of the invention by those skilled in the art, but it is not intended that the invention be limited thereto.

The drawing illustrates generally the benefits derived from the use of the present invention, with two catalysts being compared. As a general rule, the oxidation catalysts such as cobalt molybdate have a period of hyperactivity of hundreds and thousands of hours, subsequently followed by a gradual decline of productivity, to a point where the economically useful catalyst life ends. The two curves in the drawing illustrate cobalt molybdate-bismuth telluride catalysts prepared under substantially the same conditions, except that in one instance about 10% of molybdenum trioxide by weight is included in the mixture prior to fluxing particles of the mixture. As may be noted, the catalyst containing molybdenum trioxide in the pellet gave a much higher productivity during a longer period of time; i.e., the usual decline in productivity was slower for the catalyst of the invention. When the high cost of the catalyst (several dollars per pound) and the expense of charging and discharging a commercial reactor system are taken into consideration, the importance of the invention will be realized.

Among the volatile molybdenum compounds, preferred ones include molybdenum trioxide, molybdenum dichloride, molybdenum ditelluride, molybdenum tetrachloride, molybdenum trioxypentachloride, molybdenum disulfide and molybdenum sesquisulfide. Particularly preferred is molybdenum trioxide and those compounds which yield a molybdenum oxide during use of the catalyst in the subject oxidation reaction.

The cobalt molybdate is prepared by a method involving critical conditions and steps. A precipitate prepared, for example, from cobaltous nitrate hexahydrate and ammonium heptamolybdate in an aqueous ammoniacal solution is washed and dried, and calcined at a temperature maintained within the narrow critical range of from 610° C. to 630° C. for from about 6 to 10 hours when the fluxing temperature as defined herein, is from 300° C. to 600° C. for from 0.5 to 20 hours, while passing an oxygen-containing gas stream therethrough. At calcining temperatures of above 650° C. excessive molybdenum is lost. While calcining has in the past taken place at other temperatures, this narrow range of 610° C. to 630° C. has been found to unexpectedly give a marked increase in productivity of desired oxidation products derived from olefins, particularly propylene and particularly when the conditions of fluxing are as specified. It is to be realized that this aspect of the invention can be used apart from the remainder of the invention to prepare catalytic cobalt molybdate per se. Similarly, the benefits of the use of a volatile molybdenum compound in the catalyst are appreciable using cobalt molybdate prepared at other temperatures between about 560° C. and 650° C. for a minimum period of time of from about 5 hours to about 10 hours, depending on temperature.

In preparing the novel catalyst system, the calcined cobalt molybdate raw material is employed in a particle size of about 20 mesh to less than 80 mesh, and as low as 325 mesh or finer. The following percentages give a useful distribution of particle sizes:

from 0 to 20% of the cobalt molybdate, preferably 5 to 10%, is in the mesh range of 20 to 40;
from 40 to 60%, preferably 45 to 55%, is in the mesh range of 40 to 60;
from 10 to 35%, preferably 20 to 30%, is in the mesh range of 60 to 80; and
from 20 to 40%, preferably 22 to 30%, is in the mesh range of less than 80, such as down to and including 325 mesh and finer material.

A particularly advantageous range of particle sizes of cobalt molybdate comprises 50% of mesh range of 40 to 60, 25% of mesh range of 60 to 80 and 25% of mesh range of less than 80.

In order to prepare the catalyst of the present invention, one must incorporate, by fluxing, under particular conditions, (a) calcined cobalt molybdate with (b) one or more of the tellurides of arsenic, bismuth and antimony, which may be represented by the formulas: $As_2Te_3$, $Bi_2Te_3$ and $Sb_2Te_3$, respectively, together with (c) the $MoO_3$ or other volatile molybdenum compound. Usually, one would employ a single one of these tellurides in any particular catalyst system, but it is quite possible to react mixtures of two or all three of these tellurides with the cobalt molybdate, as described hereinafter. The tellurides are employed in such a particle size that 75% is in the mesh range of 80 or smaller. It is desirable to employ at least 90% of the telluride in the mesh range of 80 or smaller and most advantageous to have all of the telluride in this mesh range. The preferred telluride is that of bismuth. At least 75% of the particles of the volatile molybdenum compound should be of mesh size 80 or smaller.

The cobalt molybdate is mixed with the defined telluride or tellurides and the added volatile molybdenum compound according to stand techniques. It is desirable, in order to provide a good distribution of the particles concerned, to form a slurry or paste by stirring the components in water. The slurry or paste can then be filtered, if desired, or centrifuged to reduce the amount of water but not dry the mixture of cobalt molybdate, selected telluride or tellurides and volatile molybdenum compound. If filtration or centrifugation or other similar technique is employed, it should be kept in mind that the mixture of components should, most advantageously, be kept in a paste form. The paste can then be processed through extrusion equipment in order to provide desired shapes of the catalyst system, such as pellets and the like. A sheet or other shape can be crushed to form particles after fluxing. Alternatively, the catalyst system paste can be processed through known equipment to form tablets or the like. It is possible and within the skill of one familiar with the art to provide the catalyst system in any desired shape. In forming the slurry or paste, it is preferred to use distilled or deionized water in order to avoid the complexities of interfering metallic ions.

The pellets, tablets or the like must then be fluxed, the term being used herein to mean heating at a temperature such that te particles are bonded or sintered together, according to the following conditions of temperature, concentration and time to produce the unique catalyst of the present invention.

TABLE
[Synthesis of molybdenum-rich catalysts—variables]

| Variable | Broadest range | Preferred range |
| --- | --- | --- |
| Concentration of volatile molybdenum compound (w./w. percent) | 0.5–80 | 8–30 |
| Concentration of Group VA telluride (w./w. percent) | 0.05–20 | 0.1–1 |
| Fluxing temperature (° C.) | 300–600 | 425–525 |
| Fluxing period (hours) | 0.5–20 | 3–12 |

NOTE.—w./w.=weight of ingredient based on weight of entire mixture, dry basis.

Prior to fluxing, the dry material, such as a pellet, is friable and easily crushed. After fluxing, the material is hard, dense, and resistant to crushing. The time and temperature of calcining the cobalt molybdate and the time and temperature of fluxing are all dependent variables. For example, if the temperature is increased in one of the two heat treatments, the minimum time the material is held at the given temperature may be decreased, or the temperature or time of heating in the other heat treatment may be reduced. Thus, the critical calcining temperature of 610° C. to 630° C., used for 6–10 hours as a minimum as discussed above is used with a fluxing temperature of from 425° C. to 525° C. for from 4 to 10 hours as a minimum. The limits of temperature and the minimum time are the more important variables, longer heating than necessary at a given temperature simply being uneconomical. As is disclosed in the copending applications referred to hereinbefore, there are different preferred temperatures of fluxing for each of the tellurides.

The catalyst system of the present invention may be used, as described hereinbefore, either promoted or not. If a promoted catalyst system is contemplated, it is preferred to use copper telluride, $Cu_2Te$, as the promoter. The copper telluride promoter is employed in the range of about 0.10 to about 5.0%, preferably about 0.10 to about 1.0%, based on the weight of the unpromoted catalyst system. The copper telluride is employed in comminuted form of such a particle size that substantially all of its passes through an 80 mesh screen. The copper telluride is normally mixed with the unpromoted catalyst system by any standard mixing procedure, such as tumbling or the like, and is readily adsorbed. The step of adding a promoter, if used, follows the fluxing step.

If desired, the novel catalyst system of this invention may be deposited on a support such as silica, clay, quartz, zirconia, alumima or Carborundum by employing standard techniques known in the art. The calcining of the cobalt molybdate, the fluxing of the catalyst system, and other steps in preparing the catalyst may be carried out by either batch or continuous methods.

The catalyst system of this invention may be used to prepare various oxidation products of olefins such as unsaturated aldehydes and unsaturated acids. Representative olefins which may be used in the practice of this invention include propylene, butene-1, isobutylene, pentene-1, hexene-1, and octene-1. The catalyst system of this invention is more effective when the olefin is selected from the lower members of the aforementioned olefin series and is particularly efficient when the olefin is propylene or isobutylene, especially propylene.

Preferably, the novel catalyst system is employed in the oxidative preparation of acrylic acid by the reaction of propylene, oxygen, and water vapor. The oxidation is conducted within a temperature range of from about 350° C. to about 500° C. and the preferred range is from about 400° C. to about 460° C. Atmospheric pressure or pressures somewhat above atmospheric, such as about 1 to about 40 atmospheres, may be used. Usually, there is no significant applied pressure, and atmospheric pressure or that inherent in the equipment used is employed. For example, in a long column, there may be back pressure because of resistance to gas flow.

It is desirable in this reaction to employ an inert gas or vapor diluent with the oxygen to facilitate control of this highly exothermic oxidation reaction. Therefore, if oxygen is employed as such, it is preferred to employ a diluent such as carbon dioxide, nitrogen or the like. The carbon dioxide diluent is most economically provided from the carbon dioxide produced in the process. If oxygen is employed as the normal approximately 20% component of air, then nitrogen is already present as a useful diluent. Generally, the use of oxygen as a component of air is quite satisfactory for the purposes of this reaction.

The propylene is employed in a volume ratio with respect to oxygen of 1:0.2 to 1:2, preferably 1:0.8 to 1:1.2. The mole ratio of water to propylene is about 1:1 to 10:1, preferably about 2:1 to 6:1. It may be introduced as a spray into the preheated feed, ut the preferred method is to introduce the water as steam.

The contact time between the catalyst and the reactants ranges from 20 seconds to as low as 0.1 second, but about 0.5 to about 5 seconds is preferred. Longer contact times generally produce higher propylene conversions, but these are accompanied by an increase in waste gas formation. One skilled in the art may balance these two factors to obtain the contact time which results in the most economical operations.

Although the most preferred use of the novel catalyst system is for the oxidation of propylene to acrylic acid, isobutylene may be oxidized to methacrylic acid, using the above described reaction parameters for the conversion of propylene to acrylic acid. However, the most effective temperature range for the methacrylic acid reaction is about 360° C. to about 420° C.

Propylene may be oxidized to acrolein by using propylene, oxygen and water and following the reaction parameters for producing acrylic acid from propylene except that a lower temperature range is desirable for efficient operation. Preferably, a temperature range of from about 350° C. to about 400° C. is employed. Likewise, isobutylene may be converted to methacrolein by employing the reaction parameters of the isobutylene to methacrylic acid conversion but using a lower temperature range, preferably 325 to 375° C.

The nature of the catalyst after a period of use is considerably different than when first put on stream. For example, it has been found that the composition changes, some material having been lost by reactions or mechanisms not yet understood. A substantial change takes place in the first 100 hours of operation. Since the useful life of the catalyst should be at least 8,000 to 10,000 hours on stream, it is apparent that during most of its life, the catalyst will have a different composition than initially and a changing composition, definable only by the method of preparation, including a period of use as a step in the preparation of the catalyst. Accordingly, the invention includes the method of preparing the catalyst by steps including synthesizing calcined cobalt molybdate, fluxing it with molybdenum trioxide, bismuth telluride or other tellurides and volatile molybdenum compounds, and subjecting the catalyst to a temperature between about 350° C. and 500° C. for at least about 100 hours in the presence of steam, oxygen, and propylene or like hydrocarbon. It may be possible to achieve the same result of catalyst modification by omission of one of the vapors or gases, or by using another such as carbon monoxide, methane, propane, butane, etc., but it is preferred to use propylene. One change in the catalyst composition is in the loss of tellurium. Thus, in the first 100 hours of use 75–80% of the tellurium is lost. As has been indicated hereinabove, this use of the catalyst is considered as a step in the preparation of the ultimate catalyst.

To assist those skilled in the art to practice the present invention, the following modes of operation are suggested by way of illustration, ratios and percentages being by weight and the temperatures in ° C. unless otherwise specifically noted. Also, unless otherwise stated, the catalyst is used immediately after being fluxed.

EXAMPLE 1

This example describes a method of preparing a catalyst wherein molybdenum trioxide is the volatile molybdenum compound.

(a) The cobalt molybdate is formed as follows:

An aqueous solution, prepared by dissolving 592 grams of cobaltous nitrate hexahydrate in 700 ml. of deionized water, previously warmed to 60° C., is added to another solution prepared from 354 grams of ammonium heptamolybdate and 500 ml. of deionized water, previously warmed to 75° C. The resulting solution is agitated and maintained at 48° to 50° C., while 320 ml. of aqueous 15% ammonia is added, dropwise, over a 30-minute period. After agitating for another 15 minutes, the slurry is suction-filtered and the precipitate washed on the funnel with five one-liter portions of deionized water. The filter cake is then allowed to stand under one liter of deionized water for 72 hours. After removing the remaining water by filtration, the filter cake is reslurried with one liter of deionized water for one hour and filtered again. This filter cake is calcined for from 4 to 32 hours in an electrically heated tube at 560° to 650° C., with extraordinary results being obtained at a temperature of 610° to 630° C. for 8 hours, more or less, in the presence of a 6 liter/minute air stream. The wet filter cake, about 50% water, initially fills the tube, but as soon as the moisture evaporates, the air freely passes through the material. The cobalt molybdate catalyst is crushed to a size such that all of the particles pass through a forty mesh sieve.

(b) 200 grams of the meshed cobalt molybdate material obtained from (a) is slurried in 300 ml. deionized water with 200 g. of molybdenum trioxide and 2.23 grams 80+ mesh bismuth telluride. After an hour, the slurry is filtered and the cake tempered at 470–90° C. for 7 hours in the presence of a 6 liters/minute air flow. The physical stability (hardness) of the catalyst expressed as the weight needed to crush a $\frac{3}{16}''$ x $\frac{3}{16}''$ extruded cylinder is 13.1 lbs. The calcined cobalt molybdate has a strength of 3.0 lbs. for $\frac{1}{8}''$ particles, and 6.7 lbs. for $\frac{1}{4}''$ particles.

(c) 80 grams of the meshed cobalt molybdate material obtained from (a) is slurried in 300 ml. deionized water with 320 grams of molybdenum trioxide and 2.23 grams 80+ mesh, U.S. Series (i.e., all particles pass through an 80 mesh sieve) bismuth telluride particles. After 1 hour, the slurry is filtered and the resultant cake fluxed at about 480° C. for seven hours in the presence of a 6 liter/minute air flow. The physical stability of the catalyst, measured according to (b) above, is 8.33 pounds.

(d) 225 grams of the meshed cobalt molybdate material obtained from (a) is slurried in 300 ml. deionized water with 75 grams of molybdenum trioxide and 1.67 grams of crushed bismuth telluride. The synthesis procedure and test method of (b) are followed and the individual pellet hardness measures 23.3 pounds.

(e) 270 grams of the meshed cobalt molybdate material obtained from (a) is slurried in 300 ml. deionized water with 30 grams of molybdenum trioxide and 1.67 grams of bismuth telluride. The procedure and test method of (b) are followed and the catalyst hardness measures 23.3 pounds.

(f) The procedure of (b) above is followed except that 1.8 grams of antimony telluride is used in lieu of bismuth telluride. The same preparative procedure is followed.

(g) 200 grams of the meshed cobalt molybdate material obtained from (a) is slurried in 250 mls. deionized water with 100 grams of molybdenum trioxide and 1.47 grams of arsenic telluride. After one hour, the slurry is filtered and the cake fluxed at 520–540° C. for 8 hours in the presence of a 6 liter/minute air flow.

(h) The procedure of (g) above is repeated using 300 grams of molybdenum trioxide and a heating temperature of about 480° C. for 9 hours in the presence of a 6 liter/minute air flow.

(i) The procedure of (b) above is followed using 300 grams of the meshed cobalt molybdate material obtained from (a), 19.7 grams of molybdenum trioxide and 1.67 grams of bismuth telluride. After slurrying, the filter cake is heated to 518–530° C. for seven hours. The catalyst pellet hardness measures 43.4 pounds.

(j) The above procedure in (i) is repeated except that the heating or fluxing step is performed at 288–301° C. The catalyst hardness measured according to (b) above is 6.5 pounds.

(k) The procedure described in (i) above is repeated but the fluxing step is performed at 470–490° C. and extended to a period of twelve hours. The pellet hardness strength measures 25.5 pounds. The procedure of (i) above is again repeated by preparing a catalyst from 280 grams of the cobalt molybdate material obtained from (a) 80 grams of bismuth telluride and 40 grams of molybdenum trioxide. The catalyst hardness measures 45.3 pounds.

EXAMPLE 2

In this example the volatile molybdenum compound is molybdenum ditelluride.

(a) Using the cobalt molybdate catalyst obtained in Example 1(a) and following the preparative and test procedures of Example 1(b), 4.84 grams of molybdenum ditelluride and 1.67 grams of bismuth telluride are slurried with 300 grams of the meshed cobalt molybdate material in water. The catalyst hardness measures 38.9 pounds.

(b) Example 2(a) is repeated using 100 grams of the cobalt molybdate catalyst obtained in Example 1(a), 10.5 grams of molybdenum ditelluride and 3.0 grams of antimony telluride.

(c) 250 grams of the meshed cobalt molybdate material obtained from Example 1(a) is slurried in 350 ml. of deionized water with 70 grams of molybdenum ditelluride and 3.0 grams of 80+ mesh arsenic telluride. After one hour, the slurry is filtered and the cake heated to about 470° C. for 8 hours in the presence of a 6 liter/minute air flow.

EXAMPLE 3

This example describes the method of preparing a catalyst wherein molybdenum dichloride is the volatile molybdenum compound.

(a) 300 grams of the cobalt molybdate material obtained from Example 1(a), 23 grams of molybdenum dichloride and 1.8 grams of arsenic telluride are slurried in 350 ml. of deionized water. After one and a half hours, the slurry is filtered and the cake heated to 500° C. for ten hours in the presence of a 6 liter/minute air flow.

(b) The procedure of Example 1(b) is followed except that the catalyst is formed from 300 grams of the meshed cobalt molybdate material obtained from Example 1(a), 23 grams of molybdenum dichloride and 1.67 grams of bismuth telluride. The catalyst hardness measured according to the procedure of Example 1(b) is 19.1 pounds.

EXAMPLE 4

This example describes the method of preparing a catalyst wherein molybdenum disulfide is the volatile molybdenum compound. The catalyst is prepared by the same procedure as Example 1(b) except that 7.35 grams of molybdenum disulfide is added as the volatile molybdenum compound instead of molybdenum trioxide.

The following examples illustrate oxidation processes employing the catalyst compositions of this invention.

EXAMPLE 5

The catalyst in this example is prepared by Example 1(b) described above. The catalyst is crushed to 10/20 mesh and charged to a stainless steel tubular reactor equipped with a preheater. A gas stream having a propylene/air/water mole ratio of 1/4.6/4 is then passed through the catalyst bed. The contact time is 1.8 seconds while the reactor temperature is 430° C. The propylene conversion is 45%, and the yields of acrylic acid, acetic acid, acrolein and waste gas are 30, 4.2, 54 and 12 percent respectively. The acrylic acid productivity is 4.7 lbs./hr./ft.$^3$ catalyst.

EXAMPLE 13

The catalyst of Example 4 and the reaction conditions of Example 5 are employed. The conversion of propylene was 45%. Of this, 26% is acrylic acid, 5.9% is acetic acid, 59.3% is acrolein and 8.8% is waste gas.

EXAMPLE 14

To illustrate the importance of the calcining temperature, particles of uncalcined cobalt molybdate, as prepared in Example 1(a) are calcined at various temperatures for from about 8 to 10 hours, after which it is used to oxidize propylene to acrylic acid. The feed stream to the reactor, on a volume basis, is $C_3H_6$/air/steam= 1/4.6/4, with the following results:

| Calcining temp. | Contact time (sec.) | Temp. bath (° C.) | Temp. reactor (° C.) | $C_3H_6$ conversion (percent) | Product selectivities in percent | | |
|---|---|---|---|---|---|---|---|
| | | | | | Acrylic acid | Acetic acid | CO plus $CO_2$ |
| 600° C. (3/16" x 1/8" tableted) | 0.8 | 393 | 447 | 37 | 37 | 10 | 29 |
| | 1.8 | 378 | 402 | 29 | 32 | 18 | 27 |
| | 1.8 | 391 | 420 | 39 | 35 | 17 | 31 |
| 620° C. (5/16" tableted) | 0.8 | 390 | 451 | 39 | 40 | 6.3 | 18 |
| | 0.8 | 387 | 429 | 36 | 39 | 7.1 | 17 |
| | 1.8 | 382 | 419 | 42 | 46 | 12 | 20 |
| 640° C. (5/16" tableted) | 0.8 | 382 | 445 | 38 | 34 | 5.7 | 18 |
| | 1.8 | 371 | 400 | 38 | 34 | 10 | 19 |

EXAMPLE 6

The catalyst prepared by Example 1(c) is used under conditions similar to those in Example 5 giving an acrylic acid productivity of 0.6 lbs./hr./ft.$^3$ catalyst. The yields of acrylic acid, acetic acid, acrolein and waste gas are 8.1%, 0.9%, 83% and 7.9% respectively while the propylene conversion is 22%.

EXAMPLE 7

Using the catalyst of Example 5, but employing a reaction temperature of 390° C. and using isobutylene in lieu of propylene as the olefin, methacrylic acid is obtained as well as some methacrolein. Improved selectivity for methacrolein is obtained by reducing the reaction temperature to 350° C.

EXAMPLE 8

Using the same catalyst and reaction condition as in Example 5, but reducing the reaction temperature to 375° C., the yield of acrolein is increased.

EXAMPLE 9

Using the reaction condition of Example 5, and the catalyst of Example 1(d), a total catalyst productivity of 6.9 lbs. acrylic acid/hr./ft.$^3$ is measured, and the catalyst exhibits a propylene conversion of 57%. Of this, 35% is acrylic acid, 6.9% is acetic acid, 40% is acrolein, and 18% is waste gas.

EXAMPLE 10

The catalyst of Example 1(e) using the reaction condition of Example 5, exhibits an acrylic acid productivity of 6.0 lbs./hr./ft.$^3$ catalyst on a propylene conversion of 42%. Of the propylene converted, 41% is acrylic acid, 13% is acetic acid, 27% is acrolein and 19% is waste gas.

EXAMPLE 11

When the reaction condtion of Example 5 and the catalyst of Example 2(a) are employed, a propylene conversion of 39% is obtained. Of this, 13% is acrylic acid, 1.6% acetic acid, 80% acrolein, and 5.4% waste gas.

EXAMPLE 12

Using the catalyst of Example 3(a) and the reaction conditions of Example 5, a propylene conversion of 40% is obtained. The selectivities are 32% acrylic acid, 4.8% acetic acid, 52.2% acrolein and 11% waste gas.

The balance of the converted propylene is present mainly as acrolein. It may be seen that at comparable contact times and reaction temperatures, the 620° C. calcining temperature is much superior. For example, with the 0.8 second contact time, the 451° oxidation reaction with the material calcined at 620° C. is much superior to the reactions at 447° C. and 445° C. with materials calcined at 600° C. and 640° C. Similarly, for the 1.8 second contact time, the reaction at 419° C. for the material calcined at 620° C. is much superior to a reaction at 420° C. with catalyst calcined at 600° C.

EXAMPLE 15

(a) A catalyst is prepared using the identical procedure to Example 1(b) except that 1.67 g. of bismuth telluride is used and no molybdenum trioxide is added.

(b) A catalyst is prepared under the same conditions, but the mixture prior to fluxing or tempering contains 6 g. of molybdenum trioxide and 2.23 g. of bismuth telluride.

EXAMPLE 16

The catalysts of Example 15 are introduced into stainless steel reactors, and a gas stream having a volume ratio of propylene/air/steam of 1/4.6/4 is passed through the catalyst in each reactor while maintaining the catalyst bed temperature at 440° C., with the following results:

| Catalyst | Productivity after given number of hours on stream, as pounds acrylic acid/hr./ft.$^3$ of catalyst |
|---|---|
| 15(a) | 5.7 lbs./hr./ft.$^3$ after 12 hours. 3.4 lbs./hr./ft.$^3$ after 220 hours. |
| 15(b) | 5.1 lbs./hr./ft.$^3$ after 15 hours. 4.2 lbs./hr./ft.$^3$ after 210 hours. |

After this period of time on stream, 75–80% of the tellurium content had left the catalyst pellets. It may be noted that the productivity of catalyst 15(a) dropped by some 40%, while catalyst 15(b) lost only about 18% of its activity.

EXAMPLE 17

(a) A catalyst containing 10% molybdenum trioxide and synthesized in a manner similar to that outlined for Example 1(e) was charged to a 10 foot reactor equipped with a preheater. The reactor was operated under process conditions for over 2,000 hours. These included the use of tabletized catalyst shapes, turbulent flows, elevated pressures and continuous operation; conditions which are all typical of those normally found in most commercial converters. Catalyst productivity as a function of time on stream is shown as a broken line in the figure.

(b) A catalyst synthesized in a manner similar to 17(a) but in which the molybdenum trioxide was omitted, was charged to a reactor identical to that in 17(a). Operation under similar conditions produced the productivity-time on stream curve shown by the continuous line in the figure.

Inspection of the figure indicates that the catalyst of the present invention is far more productive than the reference, 17(b), after the 400 hours point is passed. Furthermore, at the 2,000 hour point, the catalyst of the present invention has a productivity 30% higher than the reference 17(b), despite the fact that the productivity is somewhat lower before 400 hours has elapsed.

We claim:

1. A catalyst in the form of hard particles, each particle containing a fluxed mixture comprising calcined cobalt molybdate, at least one telluride of arsenic, bismuth, or antimony, and at least about 0.5% by weight of an additional solid sublimable molybdenum compound, said amount being based on the total weight of all of components of the mixture, said sublimable molybdenum compound being molybdenum oxide or a compound which forms a molybdenum oxide in the presence of oxygen at temperatures above about 350° C.

2. The catalyst of claim 1 in which said sublimable molybdenum compound amounts to at least about 8% and less than about 30%, by weight of the mixture.

3. The catalyst of claim 2 in which the sublimable molybdenum compound is a molybdenum halide, a molybdenum oxyhalide, a molybdenum oxide, a molybdenum telluride, or a molybdenum sulfide.

4. The catalyst of claim 3 in which the sublimable molybdenum compound is molybdenum trioxide, molybdenum dichloride, molybdenum ditelluride, molybdenum tetrachloride, molybdenum trioxychloride, molybdenum disulfide or molybdenum sesquisulfide.

5. The catalyst of claim 2 in which said sublimable molybdenum compound is molybdenum trioxide and the telluride is bismuth telluride present in an amount between about 0.1% and 1% by weight of the mixture.

6. In a method of preparing catalytic cobalt molybdate, wherein cobalt molybdate is precipitated from an aqueous solution, and the precipitate is dried and calcined in the presence of oxygen at an elevated temperature, the improvement of calcining said dried precipitate at a temperature between 610° C. and 630° C. for a period of at least about 6 hours.

7. A method of preparing a catalyst comprising mixing particles of calcined cobalt molybdate with particles of a telluride of arsenic, antimony, or bismuth, and at least about 0.5% by weight of particles of a sublimable molybdenum compound, and fluxing the mixture at a temperature of from 300° to 600° C. for at least 0.5 hour, the time and temperature being sufficient to convert the particulate mixture into a strong, solid compact structure, the concentration of said volatile molybdenum compound being 0.5–80%, the concentration of the arsenic, antimony, or bismuth telluride being 0.05–20%, and the remainder consisting essentially of cobalt molybdate, said sublimable molybdenum compound being molybdenum oxide or a compound which forms a molybdenum oxide in the presence of oxygen at temperatures above about 350° C.

8. The method of claim 7 in which said sublimable molybdenum compound is present in an amount between about 8% and 30% by weight of the mixture and is selected from the group consisting of a molybdenum halide, a molybdenum oxyhalide, a molybdenum oxide, and a molybdenum sulfide, said telluride is bismuth telluride present in an amount between about 0.1% and 1% by weight of the mixture, said cobalt molybdate is prepared by calcining in the presence of oxygen at a temperature between about 610° C. and 630° C., and said mixture is fluxed at a temperature between about 425° C. and 525° C. for at least about 3 hours.

9. The method of claim 8 in which said sublimable molybdenum compound is molybdenum trioxide.

10. The method of claim 9 in which said catalyst is further modified by passing a stream of gas therethrough, while maintaining the temperature of the catalyst at between about 350° C. and 500° C. for a period of at least about 100 hours, whereby the tellurium content of the catalyst is diminished.

11. In a method of preparing a catalyst in which the essential catalytic ingredient is calcined cobalt molybdate, the improvement of calcining said cobalt molybdate at a temperature of from 610° C. to 630° C., combining with said cobalt molybdate an additional sublimable molybdenum compound to provide the catalyst, said molybdenum compound being a molybdenum oxide or a compound which forms a molybdenum oxide in the presence of oxygen at temperatures above about 350° C., forming the catalyst into a paste, drying the same and fluxing the catalyst at 425° to 525° C.

References Cited

UNITED STATES PATENTS

| | | | |
|---|---|---|---|
| 3,527,716 | 9/1970 | Nemec et al. | 252—439 |
| 3,641,138 | 2/1972 | Ondrey et al. | 252—439 X |
| 3,637,835 | 1/1972 | Nemec et al. | 252—439 X |
| 3,098,102 | 7/1963 | Bethell et al. | 252—470 X |
| 3,322,693 | 5/1967 | Bethell et al. | 252—470 |
| 3,415,760 | 12/1968 | Hadley et al. | 252—470 |
| 3,578,707 | 5/1971 | Bethell et al | 252—470 X |
| 3,260,682 | 7/1966 | Calvin et al. | 252—470 X |
| 3,584,040 | 6/1971 | Nemec et al. | 252—439 X |

PATRICK P. GARVIN, Primary Examiner

U.S. Cl. X.R.

252—470; 260—533 N, 604 R